(12) United States Patent
Jiang et al.

(10) Patent No.: US 11,140,091 B2
(45) Date of Patent: Oct. 5, 2021

(54) OPENFLOW PROTOCOL-BASED RESOURCE CONTROL METHOD AND SYSTEM, AND APPARATUS

(71) Applicant: HUAWEI TECHNOLOGIES CO., LTD., Guangdong (CN)

(72) Inventors: Zhihua Jiang, Beijing (CN); Peng Ma, Beijing (CN); Hui Ni, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 15/858,815

(22) Filed: Dec. 29, 2017

(65) Prior Publication Data

US 2018/0123969 A1 May 3, 2018

Related U.S. Application Data

(63) Continuation of application No. PCT/CN2016/086759, filed on Jun. 22, 2016.

(30) Foreign Application Priority Data

Jun. 30, 2015 (CN) .......................... 201510373310.2

(51) Int. Cl.
*H04L 12/911* (2013.01)
*H04L 12/24* (2006.01)
(Continued)

(52) U.S. Cl.
CPC .......... *H04L 47/72* (2013.01); *H04L 41/0816* (2013.01); *H04L 41/0823* (2013.01);
(Continued)

(58) Field of Classification Search
CPC ..... H04L 41/0816; H04L 47/72; H04L 49/70; H04L 41/0823; H04L 43/0876; H04L 41/0896

See application file for complete search history.

(56) References Cited

U.S. PATENT DOCUMENTS

2012/0300615 A1* 11/2012 Kempf .................. H04W 24/02
  370/216
2014/0089506 A1 3/2014 Puttaswamy Naga et al.
(Continued)

FOREIGN PATENT DOCUMENTS

CN   103338163 A   10/2013
CN   103780471 A   5/2014
(Continued)

OTHER PUBLICATIONS

Office Action, dated Nov. 27, 2018, in Chinese Application No. 201580020619.1 (7 pp.).
(Continued)

*Primary Examiner* — Philip J Chea
*Assistant Examiner* — Mohammed Ahmed
(74) *Attorney, Agent, or Firm* — Womble Bond Dickinson (US) LLP

(57) ABSTRACT

An OpenFlow protocol-based resource control method and system, and an apparatus are provided, to resolve a problem that forwarding resources are not fully used. The method provided by the present invention may include: sending, by a controller, a resource allocation request message to a forwarder, where an OpenFlow interface is established between the controller and the forwarder; receiving, by the controller, a resource configuration message that is sent by the forwarder in response to the resource allocation request message, where the resource configuration message includes an idle forwarding resource obtained by the forwarder from total forwarding resources; and allocating, by the controller according to the idle forwarding resource, a service-accessible forwarding resource to an already created service on the controller, where the service-accessible forwarding resource is some or all resources in idle forwarding resources.

12 Claims, 7 Drawing Sheets

(51) Int. Cl.
*H04L 12/26* (2006.01)
*H04L 12/931* (2013.01)
*H04L 12/715* (2013.01)

(52) U.S. Cl.
CPC ...... *H04L 41/0896* (2013.01); *H04L 43/0876* (2013.01); *H04L 49/70* (2013.01); *H04L 45/64* (2013.01); *H04L 49/354* (2013.01)

(56) References Cited

U.S. PATENT DOCUMENTS

| | | | |
|---|---|---|---|
| 2014/0173018 A1 | 6/2014 | Westphal et al. | |
| 2015/0023210 A1* | 1/2015 | Kis | H04L 41/0806 370/254 |
| 2015/0127805 A1* | 5/2015 | Htay | H04L 43/0876 709/224 |
| 2015/0154258 A1* | 6/2015 | Xiong | G06F 16/24542 707/718 |
| 2016/0127811 A1* | 5/2016 | Amokrane | H04L 43/0882 398/58 |
| 2016/0182380 A1* | 6/2016 | Mehra | H04L 47/125 |
| 2016/0197839 A1* | 7/2016 | Li | H04L 47/6295 370/392 |
| 2017/0026244 A1* | 1/2017 | Kamath | H04L 41/12 |
| 2017/0329639 A1* | 11/2017 | Morper | G06F 9/5072 |
| 2018/0123969 A1* | 5/2018 | Jiang | H04L 41/0816 |

FOREIGN PATENT DOCUMENTS

| | | |
|---|---|---|
| CN | 104125576 A | 10/2014 |
| CN | 104253767 A | 12/2014 |

OTHER PUBLICATIONS

Extended European Search Report dated Mar. 15, 2018, in corresponding European Patent Application No. 16817187.4, 8 pgs.
Open Networking Foundation, "Openflow Switch Specification", Version 1.4.0 (wire Protocol 0x05), Oct. 14, 2013, ONF TS-012, 206 pgs.
International Search Report dated Aug. 31, 2016 in corresponding International Patent Application No. PCT/CN2016/086759.
Written Opinion of the International Search Authority dated Aug. 31, 2016 in corresponding International Patent Application No. PCT/CN2016/086759.
Office Action, dated Nov. 30, 2018, in Chinese Application No. 201510373310.2 (6 pp.).

* cited by examiner

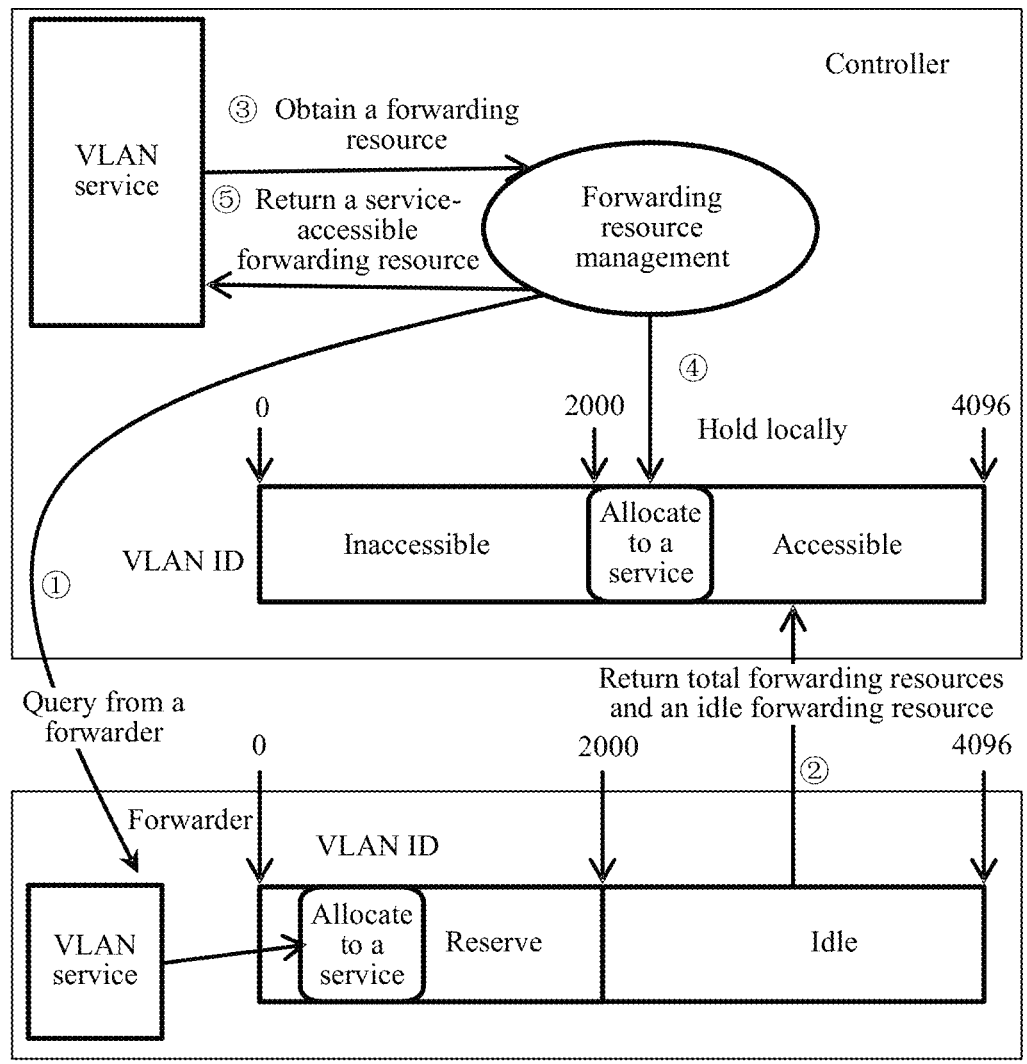
FIG. 4-a

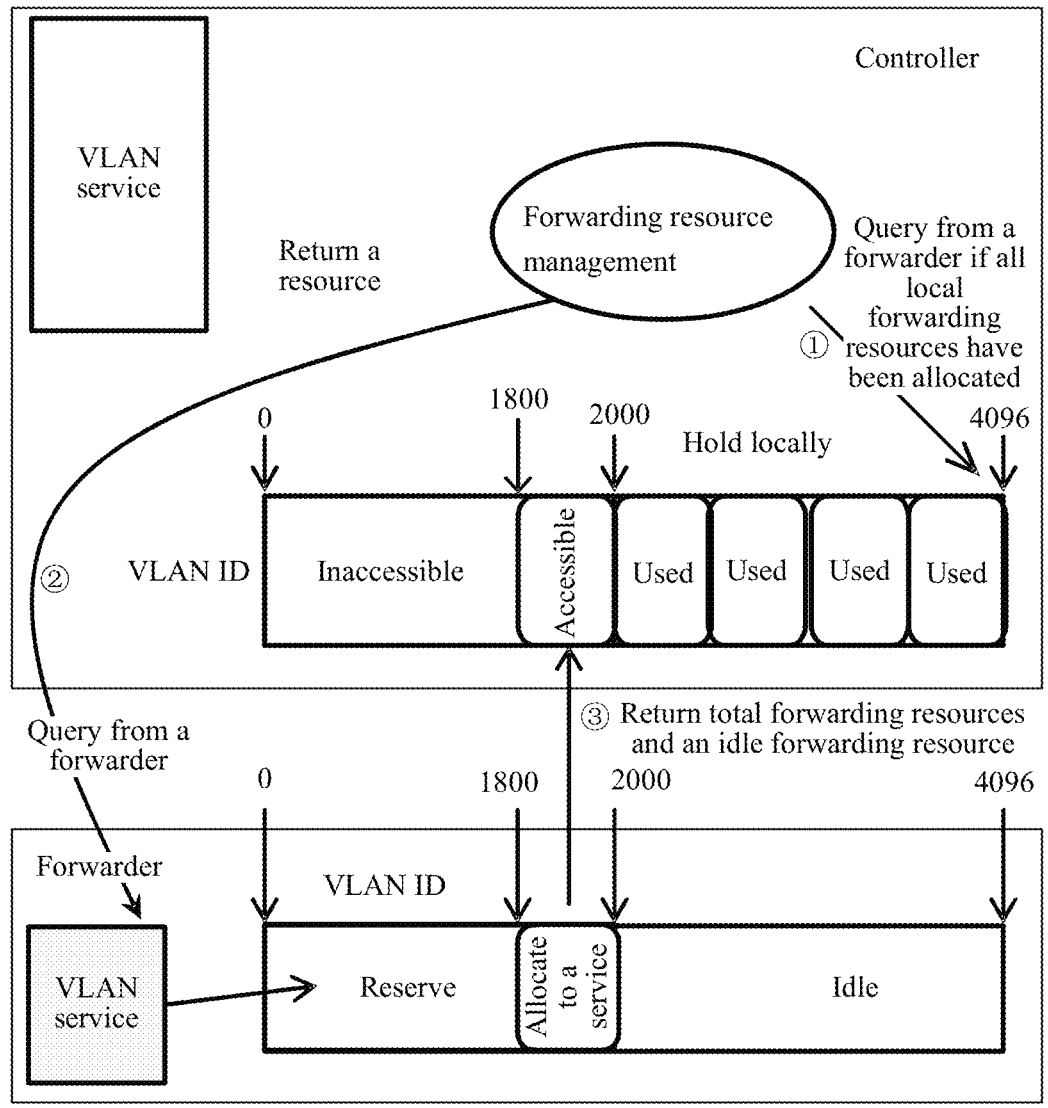
FIG. 4-b

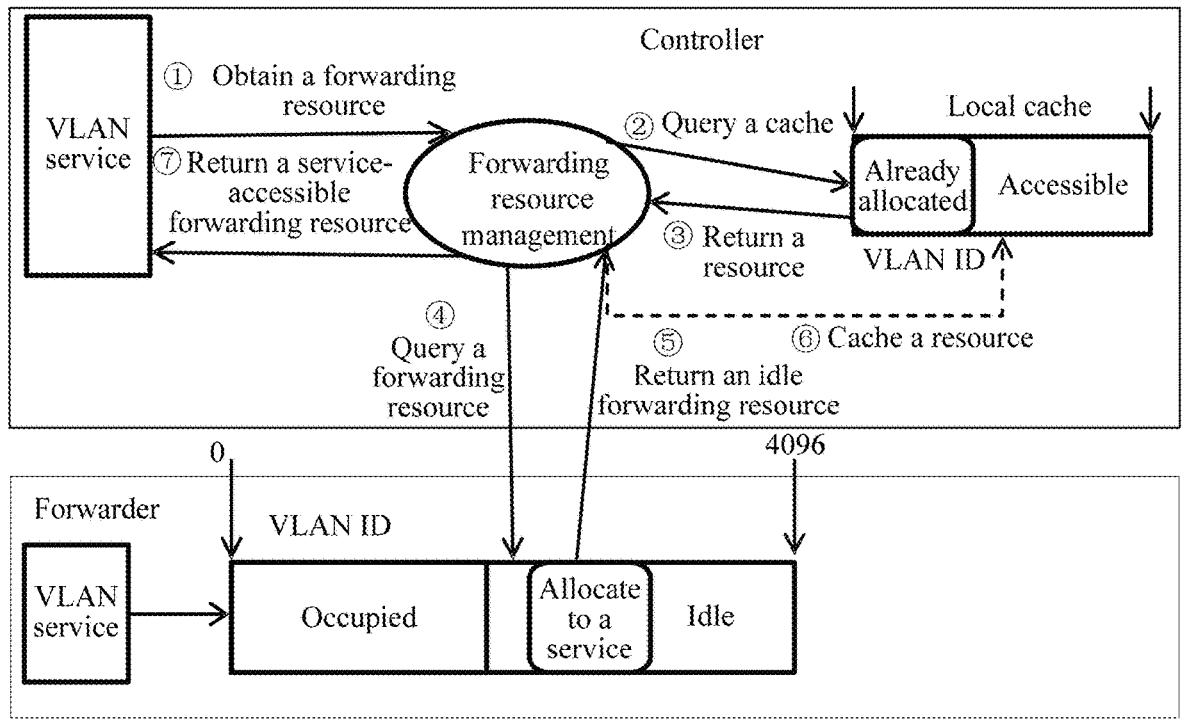
FIG. 4-c
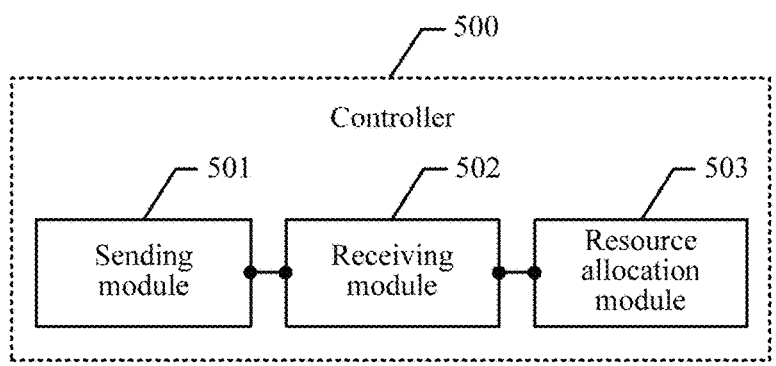
FIG. 5-a

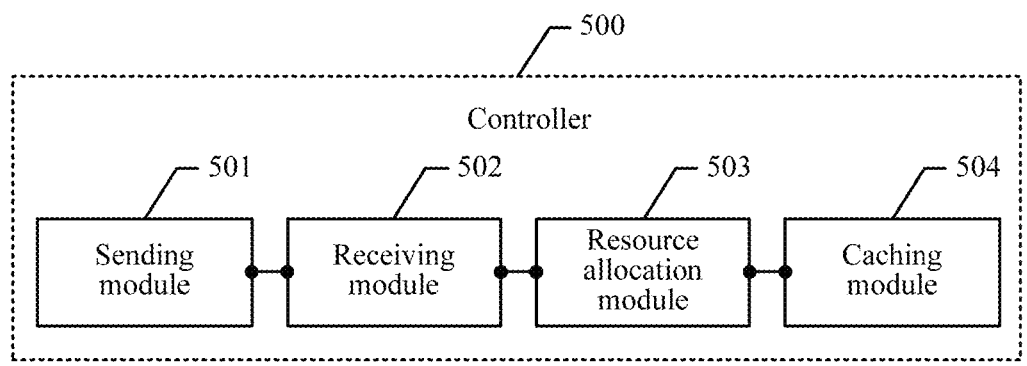
FIG. 5-b
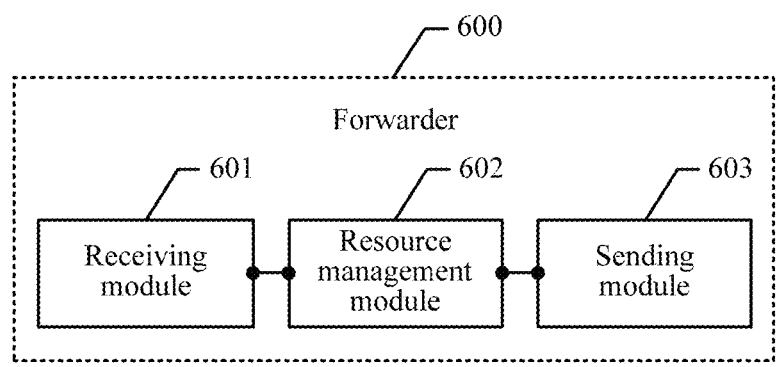
FIG. 6
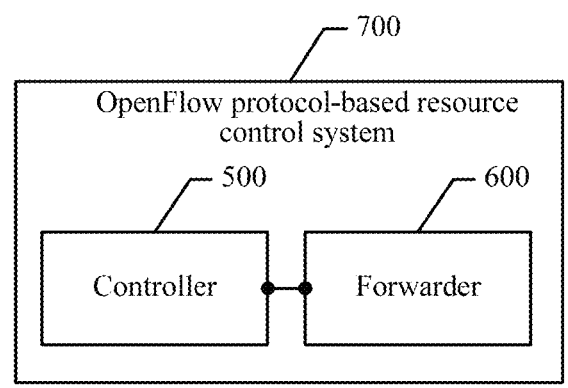
FIG. 7

OPENFLOW PROTOCOL-BASED RESOURCE CONTROL METHOD AND SYSTEM, AND APPARATUS

CROSS-REFERENCE TO RELATED APPLICATIONS

This application is a continuation of International Application No. PCT/CN2016/086759, filed on Jun. 22, 2016, which claims priority to Chinese Patent 201510373310.2, filed on Jun. 30, 2015. The disclosures of the aforementioned applications are hereby incorporated by reference in their entireties.

TECHNICAL FIELD

This application relates to the field of communications technologies, and in particular, to an OpenFlow protocol-based resource control method and system, and an apparatus.

BACKGROUND

OpenFlow is a communication protocol defined by the Open Networking Foundation (ONF). OpenFlow is used for providing access from a controller to a forwarder in software-defined networking (SDN). The SDN has features of being open and programmable and supporting separation of control and forwarding.

A principle of the SDN technology is to abstract a forwarding process into two objects: match and instruction. A packet forwarding process is to match a flow table according to packet information, and after the matching, perform forwarding according to an instruction specified in the flow table.

In conventional SDN, a forwarding plane of a service is on a forwarder, and respective control planes of all services are on a controller. The forwarder receives a flow table, and performs forwarding as required by an entry in the flow table, to implement separation of forwarding and control. The controller usually runs on a server. However, in a hybrid mode of SDN, control planes of some of multiple services on the forwarder are on the controller, and control planes of some services are on the forwarder. In the following descriptions, a service whose control plane is on the forwarder on which a forwarding plane of the service is located is referred to as a service on the forwarder, and a service whose control plane is in the controller is referred to as a service on the controller. For example, when a virtual local area network (VLAN) service is configured in the SDN, some forwarding resources (for example, a VLAN ID) need to be allocated for use by a VLAN service on the forwarder, and some forwarding resources need to be allocated for use by a VLAN service on the controller. In this case, a VLAN ID allocated for use by the controller may conflict with a VLAN ID allocated for use by the forwarder. Even if different services are configured on the forwarder and the controller, a conflict problem may exist if these different services have a same forwarding feature. For example, a layer-2 virtual private network (VPN) service is configured on the forwarder, and a layer-3 VPN service is configured on the controller. When the layer-2 VPN service and the layer-3 VPN service are forwarded according to labels, the labels need to be allocated to both the layer-2 VPN service and the layer-3 VPN service. This also causes a conflict.

To resolve a conflict in use of forwarding resources by the forwarder and the controller, the forwarding resources may be divided into two parts. Some forwarding resources are allocated for use by the controller, and the remaining forwarding resources are allocated for use by the forwarder. For example, the forwarding resources are VLAN IDs, and all the VLAN IDs are 0 to 4096. Assuming that in the VLAN ID resources, 100 to 4096 are allocated to the controller, and 0 to 99 are allocated to the forwarder, the foregoing conflict problem can be resolved because different forwarding resources are used by the controller and the forwarder. However, this reduces utilization of forwarding resources. For example, if a service is configured only on the controller and no service is configured on the forwarder, the forwarding resources allocated to the forwarder are wasted. If a service is configured only on the forwarder and no service is configured on the controller, the resources allocated to the controller are wasted.

SUMMARY

This application provides an OpenFlow protocol-based resource control method and system, and an apparatus, to resolve a problem that forwarding resources are not fully used.

According to a first aspect, an OpenFlow protocol-based resource control method is provided, including:

sending, by a controller, a resource allocation request message to a forwarder, where an OpenFlow interface is established between the controller and the forwarder;

receiving, by the controller, a resource configuration message that is sent by the forwarder in response to the resource allocation request message, where the resource configuration message includes an idle forwarding resource obtained by the forwarder from total forwarding resources; and allocating, by the controller according to the idle forwarding resource, a service-accessible forwarding resource to an already created service on the controller, where the service-accessible forwarding resource is some or all resources in the idle forwarding resource.

With reference to the first aspect, in a first possible implementation of the first aspect, the sending, by a controller, a resource allocation request message to a forwarder includes:

when the controller establishes an initial connection to the forwarder, sending, by the controller to the forwarder, a resource allocation request message for requesting to obtain multiple resources; and if multiple idle forwarding resources obtained by the controller have been allocated, re-sending, by the controller to the forwarder, the resource allocation request message for requesting to obtain multiple resources; and the receiving, by the controller, a resource configuration message that is sent by the forwarder in response to the resource allocation request message includes:

receiving, by the controller, a resource configuration message that is re-sent by the forwarder in response to the resource allocation request message, where the resource configuration message that is re-sent by the forwarder includes multiple idle forwarding resources re-obtained by the forwarder from the total forwarding resources.

According to a second aspect, an OpenFlow protocol-based resource control method is further provided, including:

receiving, by a forwarder, a resource allocation request message by a controller, where an OpenFlow interface is established between the forwarder and the controller;

obtaining, by the forwarder, an idle forwarding resource from total forwarding resources according to the resource allocation request message; and sending, by the forwarder, a resource configuration message to the controller, where the resource configuration message includes the idle forwarding resource obtained by the forwarder.

With reference to the second aspect, in a first possible implementation of the second aspect, the receiving, by a forwarder, a resource allocation request message sent by a controller includes:

when the forwarder establishes an initial connection to the controller, receiving, by the forwarder, a resource allocation request message for requesting to obtain multiple resources; and the obtaining, by the forwarder, an idle forwarding resource from total forwarding resources according to the resource allocation request message is specifically:

obtaining, by the forwarder, multiple idle forwarding resources from the total forwarding resources according to the resource allocation request message for requesting to obtain multiple resources.

According to a third aspect, a controller is further provided, including:

a sending module, configured to send a resource allocation request message to a forwarder, where an OpenFlow interface is established between the controller and the forwarder;

a receiving module, configured to receive a resource configuration message that is sent by the forwarder in response to the resource allocation request message, where the resource configuration message includes an idle forwarding resource obtained by the forwarder from total forwarding resources; and a resource allocation module, configured to allocate, according to the idle forwarding resource, a service-accessible forwarding resource to an already created service on the controller, where the service-accessible forwarding resource is some or all resources in the idle forwarding resource.

With reference to the third aspect, in a first possible implementation of the third aspect, the sending module is specifically configured to: when the controller establishes an initial connection to the forwarder, send, to the forwarder, a resource allocation request message for requesting to obtain multiple resources; and if multiple idle forwarding resources obtained by the controller have been allocated, re-send, to the forwarder, the resource allocation request message for requesting to obtain multiple resources; and the receiving module is specifically configured to receive a resource configuration message that is re-sent by the forwarder in response to the resource allocation request message, where the resource configuration message that is re-sent by the forwarder includes multiple idle forwarding resources re-obtained by the forwarder from the total forwarding resources.

According to a fourth aspect, a forwarder is further provided, including:

a receiving module, configured to receive a resource allocation request message sent by a controller, where an OpenFlow interface is established between the forwarder and the controller;

a resource management module, configured to obtain an idle forwarding resource from total forwarding resources according to the resource allocation request message; and a sending module, configured to send a resource configuration message to the controller, where the resource configuration message includes the idle forwarding resource obtained by the forwarder.

With reference to the fourth aspect, in a first possible implementation of the fourth aspect, the receiving module is specifically configured to: when the forwarder establishes an initial connection to the controller, receive a resource allocation request message for requesting to obtain multiple resources; and the resource management module is specifically configured to obtain multiple idle forwarding resources from the total forwarding resources according to the resource allocation request message for requesting to obtain multiple resources.

According to a fifth aspect, an OpenFlow protocol-based resource control system is further provided, including a controller and a forwarder, where an OpenFlow interface is established between the controller and the forwarder;

the controller is the controller according to any one of the third aspect; and the forwarder is the forwarder according to any one of the fourth aspect.

In this application, the OpenFlow interface is established between the controller and the forwarder. The controller sends the resource allocation request message to the forwarder. The controller receives the resource configuration message sent by the forwarder. The resource configuration message includes the idle forwarding resource obtained by the forwarder from the total forwarding resources. The controller allocates, according to the idle forwarding resource, the service-accessible forwarding resource to the already created service on the controller. The service-accessible forwarding resource is some or all resources in the idle forwarding resources. After allocating the service-accessible forwarding resource to the service, the controller may deliver data to the already created service. In embodiments of the present invention, the controller queries, from the forwarder, the idle forwarding resource in the total forwarding resources and allocates the idle forwarding resource for use by the service. This can satisfy a requirement of the service on the controller for a forwarding resource while not affecting allocation of a forwarding resource to a service of the forwarder by the forwarder. Use of the forwarding resources by the forwarder and the controller causes no conflict, and the problem in the prior art that forwarding resources are not fully used can also be resolved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons skilled in the art may still derive other drawings from these accompanying drawings.

FIG. 4-*a* is a schematic diagram of an application scenario in which a controller queries an idle forwarding resource from a forwarder according to an embodiment of the present invention;

FIG. 4-*b* is a schematic diagram of another application scenario in which a controller queries an idle forwarding resource from a forwarder according to an embodiment of the present invention;

FIG. 4-*c* is a schematic diagram of another application scenario in which a controller queries an idle forwarding resource from a forwarder according to an embodiment of the present invention;

FIG. 5-*a* is a schematic structural composition diagram of a controller according to an embodiment of the present invention;

FIG. 5-*b* is a schematic structural composition diagram of another controller according to an embodiment of the present invention;

FIG. 6 is a schematic structural composition diagram of a forwarder according to an embodiment of the present invention;

FIG. 7 is a schematic structural composition diagram of an OpenFlow protocol-based resource control system according to an embodiment of the present invention;

DESCRIPTION OF EMBODIMENTS

The embodiments of the present invention provide an OpenFlow protocol-based resource control method and system, and an apparatus, to resolve a problem that forwarding resources are not fully used.

To make the inventive objectives, features, and advantages of the embodiments of the present invention clearer and more comprehensible, the following clearly describes the technical solutions in the embodiments of the present invention with reference to the accompanying drawings in the embodiments of the present invention.

Figure 1:
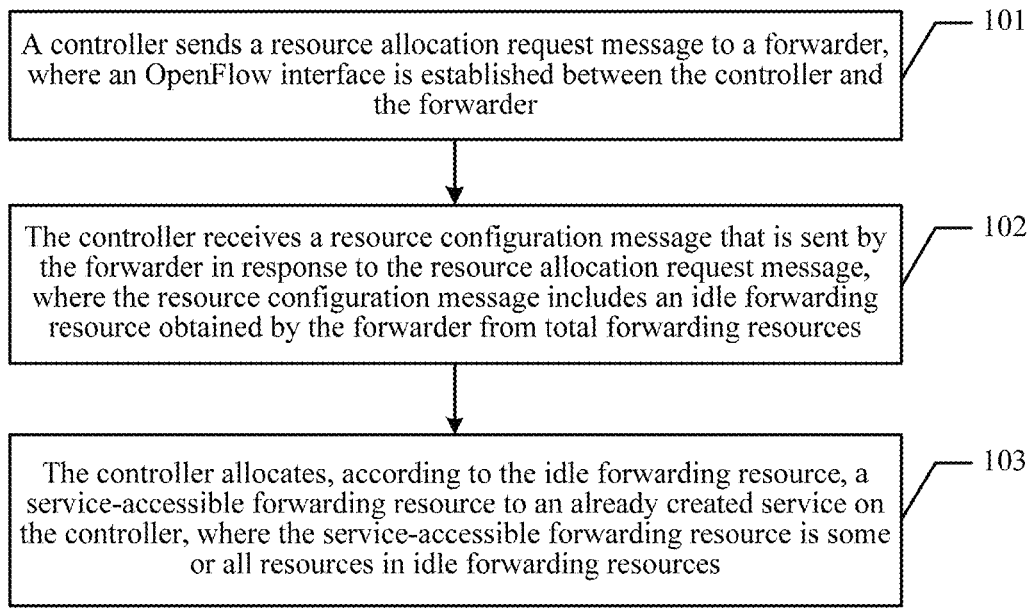
FIG. 1 is a schematic block diagram of a procedure of an OpenFlow protocol-based resource control method according to an embodiment of the present invention.

An embodiment of the OpenFlow protocol-based resource control method in the present invention may be applied to a scenario of control and service hybrid deployment on a controller and a forwarder, so that the controller queries an idle forwarding resource from the forwarder, and may be applied to a hybrid mode in which services are configured on both the controller and the forwarder. Referring to FIG. 1, an OpenFlow protocol-based resource control method provided by an embodiment of the present invention may specifically include the following steps.

101. A controller sends a resource allocation request message to a forwarder, where an OpenFlow interface is established between the controller and the forwarder.

The controller may implement a control plane function in an architecture of separation of a control plane and a forwarding plane of SDN. The controller may be specifically implemented as a server. The forwarder may implement a forwarding plane function in an architecture of separation of a control plane and a forwarding plane of SDN. The forwarder may be specifically implemented as a switch, a router, or the like. In this embodiment of the present invention, the controller and the forwarder may communicate with each other based on an OpenFlow protocol. An OpenFlow interface is established between the controller and the forwarder. The controller and the forwarder may extend the OpenFlow interface. The extended OpenFlow interface may be configured to implement querying, by the controller, an idle forwarding resource from the forwarder. Specifically, a field may be added to a query message in the OpenFlow interface. The added field is used to implement querying, by the controller, an idle forwarding resource from the forwarder. For example, in this embodiment of the present invention, a control field may be added to multipart messages of the OpenFlow interface, and used to implement querying, by the controller, an idle forwarding resource from the forwarder. The multipart messages are a type of message in the OpenFlow protocol and used for interaction between the controller and the forwarder.

The controller sends a resource allocation request message to the forwarder by using the OpenFlow interface between the controller and the forwarder, to query an idle forwarding resource from the forwarder. A forwarding resource existing on the forwarder is an identity (ID) resource used for describing forwarding, such as a VLAN ID resource, a label resource, or a virtual routing and forwarding (VRF) resource. In this embodiment of the present invention, the controller needs to query an idle forwarding resource from the forwarder, and the forwarder returns a forwarding resource to the controller.

In some implementations of this embodiment of the present invention, the sending, by a controller, a resource allocation request message to a forwarder may specifically include the following step:

A1. when the controller establishes an initial connection to the forwarder, the controller sends, to the forwarder, a resource allocation request message for requesting to obtain multiple resources; or A2. when a forwarding resource needs to be allocated to a service on the controller, the controller sends, to the forwarder, a resource allocation request message that corresponds to the service to which the forwarding resource needs to be allocated.

Specifically, a specific implementation of querying, by the controller, an idle forwarding resource from the forwarder is described in detail in A1, and another specific implementation of querying, by the controller, an idle forwarding resource from the forwarder is described in detail in A2. In some implementations of this embodiment of the present invention, the controller may query an idle forwarding resource from the forwarder by using the manners in A1 and A2. Moreover, the querying, by the controller, an idle forwarding resource from the forwarder may not be limited to the foregoing implementations in A1 and A2. In A1, the controller queries an idle forwarding resource from the forwarder when the controller establishes an initial connection to the forwarder. That is, the controller can query an idle forwarding resource from the forwarder when a connection relationship is initially established between the controller and the forwarder. In such a manner of querying an idle forwarding resource from the forwarder, an idle forwarding resource is queried in advance before a service is created on the controller. The controller has obtained the idle forwarding resource from the forwarder before the service is created, and the controller may query multiple resources from the forwarder at the same time, to satisfy resource allocation requirements of multiple services on the controller. However, that the controller queries multiple resources from the forwarder is merely an implementable manner. Moreover, the controller may query a single resource from the forwarder. A specific implementation is not limited. In A2, the controller queries an idle forwarding resource from the forwarder only when a forwarding resource needs to be allocated to a service on the controller, so as to query an idle forwarding resource in real time according to a requirement of a service on the controller.

Further, in an implementation in which the manner of querying an idle forwarding resource from the forwarder in A1 is used, after the controller sends, to the forwarder, the resource allocation request message for requesting to obtain multiple resources, the following step may further be included:

B1. if multiple idle forwarding resources obtained by the controller have been allocated, the controller re-sends, to the forwarder, the resource allocation request message for requesting to obtain multiple resources.

In an implementation of step B1, the controller queries an idle forwarding resource from the forwarder before a forwarding resource is allocated to an already created service on the controller. In this case, when the multiple idle forwarding resources obtained by the controller have been allocated, the controller further needs to re-send, to the forwarder, the resource allocation request message for requesting to obtain multiple resources. The controller may still query an idle forwarding resource again from the forwarder in a manner of performing querying in advance before an idle forwarding resource is allocated to a service, to satisfy a requirement of the service on the controller for a resource.

102. The controller receives a resource configuration message that is sent by the forwarder in response to the resource allocation request message, where the resource configuration message includes an idle forwarding resource obtained by the forwarder from total forwarding resources.

In this embodiment of the present invention, after the controller sends the resource allocation request message to the forwarder by using the OpenFlow interface, the forwarder may receive the resource allocation request message sent by the controller, and the forwarder may obtain the idle forwarding resource from the total forwarding resources according to the resource allocation request message. For example, the forwarder may store the total forwarding resources, or the forwarder may not store the total forwarding resources but determine the total forwarding resources in a default configuration manner. A service of the forwarder may occupy some forwarding resources in the total forwarding resources. Alternatively, when no service is currently created on the forwarder, the forwarder may reserve some forwarding resources in the total forwarding resources for the forwarder. The forwarder may determine, according to whether a service is created on the forwarder and how many forwarding resources are occupied by an already created service, forwarding resources from the total forwarding resources as idle forwarding resources to be sent to the controller. For example, the forwarder reserves, from the total forwarding resources, some forwarding resources for use by a service of the forwarder, then uses a forwarding resource remaining in the total forwarding resources as an idle forwarding resource, and sends the idle forwarding resource to the controller. As queried by the controller, the forwarder may select an idle forwarding resource from the total forwarding resources according to the foregoing implementation. Then the forwarder sends, to the controller, the resource configuration message carrying the idle forwarding resource. The controller receives, by using the OpenFlow interface, the resource configuration message sent by the forwarder.

That the resource configuration message sent by the forwarder includes the idle forwarding resource obtained by the forwarder from the total forwarding resources may specifically have multiple implementations. For example, the resource configuration message sent by the forwarder may directly include the idle forwarding resource. Alternatively, the resource configuration message sent by the forwarder may include an already occupied forwarding resource. A resource remaining in the total forwarding resources other than the already occupied forwarding resource is the idle forwarding resource. The controller may also determine the idle forwarding resource according to an already occupied forwarding resource included in the resource configuration message. The controller may obtain, according to the received resource configuration message, the idle forwarding resource that is obtained for the controller by the forwarder from the total forwarding resources. The controller may complete reservation of the idle forwarding resource, to satisfy a requirement of a service created on the controller.

In the description in the foregoing implementation of this embodiment of the present invention, between the controller and the forwarder, the controller queries an idle forwarding resource from the forwarder, and the forwarder returns a forwarding resource to the controller by using the OpenFlow interface. If step B1 is performed, step 102 in this embodiment of the present invention may specifically include the following step:

B2. the controller receives a resource configuration message that is re-sent by the forwarder in response to the resource allocation request message, where the resource configuration message that is re-sent by the forwarder includes multiple idle forwarding resources re-obtained by the forwarder from the total forwarding resources.

In an implementation of step B2, the controller queries the idle forwarding resource from the forwarder in a manner of querying multiple resources in advance. In this case, when the multiple idle forwarding resources obtained by the controller have been allocated, the controller further needs to re-send, to the forwarder, the resource allocation request message for requesting to obtain multiple resources. The controller still uses the manner of querying multiple resources in advance. The forwarder re-obtains multiple idle forwarding resources from the total forwarding resources, and then sends the re-obtained multiple idle forwarding resources to the controller. After all the multiple previously found forwarding resources are completely used, the controller continues to query multiple idle forwarding resources in advance. In this way, the controller may reserve the multiple idle forwarding resources, to satisfy an allocation requirement of a service on the controller.

103. The controller allocates, according to the idle forwarding resource, a service-accessible forwarding resource to an already created service on the controller, where the service-accessible forwarding resource is some or all resources in idle forwarding resources.

In some implementations of the present invention, step 103 of allocating, by the controller according to the idle forwarding resource, a service-accessible forwarding resource to an already created service on the controller may specifically include the following steps:

C1. the controller stores the idle forwarding resource included in the resource configuration message into a resource pool; and C2. the controller obtains the idle forwarding resource from the resource pool and allocates the idle forwarding resource to the already created service on the controller.

Specifically, in an implementation scenario of the present invention in which the controller allocates a service-accessible forwarding resource to an already created service on the controller, the controller may create one resource pool for each forwarder on the controller. The resource pool has two functions: storing the idle forwarding resource of the forwarder, and performing resource allocation and management for the service on the controller. After obtaining the idle forwarding resource from the forwarder, the controller stores collected idle forwarding resources into the resource pool. When the service on the controller needs to use an idle forwarding resource, the controller may obtain an idle forwarding resource from the resource pool and allocate the idle forwarding resource to the already created service on the controller. The controller can conveniently manage the idle forwarding resource by using the resource pool.

In this embodiment of the present invention, the controller may obtain, according to the received resource configuration message, the idle forwarding resource allocated to the controller by the forwarder from the total forwarding resources. Subsequently, the controller allocates, from the idle forwarding resources, the service-accessible forwarding resource to the already created service on the controller. The service-accessible forwarding resource is an idle forwarding resource allocated by the controller from received idle forwarding resources to the service created on the controller. There may be multiple specific manners of allocating, by the controller, a service-accessible resource to the service. For example, how to allocate an idle forwarding resource may be determined according to a size, a priority, or the like of the already created service on the controller.

In some implementations of this embodiment of the present invention, after step 103 of allocating, by the controller according to the idle forwarding resource, a service-accessible forwarding resource to an already created service on the controller, the OpenFlow protocol-based resource control method provided by the present invention may further include the following step:

D1. the controller sends a resource release request message to the forwarder, where the resource release request message includes an idle forwarding resource released by the controller.

An implementation of step D1 may be applied to an application scenario in which the forwarder operates independently and then the controller performs takeover. In this embodiment of the present invention, the OpenFlow interface between the controller and the forwarder is extended. The extended OpenFlow interface may be used to both query and release an idle forwarding resource. Specifically, when the controller does not need to use some idle forwarding resources, the controller may send a resource release request message to the forwarder after determining idle forwarding resources that need to be released. After receiving the resource release request message, the forwarder may obtain an idle forwarding resource released by the controller. The forwarder may recycle the idle forwarding resource released by the controller, and the forwarder adds, to the total forwarding resources, the idle forwarding resource released by the controller. The forwarder returns a resource release success message to the controller. The idle forwarding resource recycled by the forwarder may be used to be returned to the controller during querying by the controller next time, or provided for use by a service of the forwarder.

In some implementations of this embodiment of the present invention, after the allocating, by the controller according to the idle forwarding resource, a service-accessible forwarding resource to an already created service on the controller, the OpenFlow protocol-based resource control method provided by the present invention may further include the following step:

E1. establish an association relationship between the already created service on the controller and the service-accessible forwarding resource allocated to the service, and store the association relationship in a local cache of the controller, so that the controller reallocates a service-accessible forwarding resource to the service according to the association relationship.

That is, in some implementations of this embodiment of the present invention, for example, an association relationship between a service A and a service-accessible forwarding resource allocated to the service A may be established. In some abnormal cases, after the service-accessible forwarding resource is released, the service-accessible forwarding resource allocated to the service A may further be found from a local cache according to the association relationship, and the found service-accessible forwarding resource is reallocated to the service A. Descriptions are provided below by using an example. Caching may be performed based on a service. A service-accessible forwarding resource and a feature of the service are cached together. In this way, if a configuration is incorrectly deleted, reconfiguration can be performed immediately, and an original service-accessible forwarding resource can also be obtained. For example, in configuration of a static VPN, an allocated VRF ID and a VPN instance are cached together. Therefore, an association relationship between the VRF ID and the VPN instance is stored. Assuming that a VRF ID corresponding to a VPN instance 1 is equal to 1, the VRF ID=1 and the VPN instance 1 are cached together during caching, so that the resource, that is, the VRF ID being equal to 1, can be used only by the VPN instance 1.

It can be learned from the descriptions in the foregoing embodiment of the present invention, the OpenFlow interface is established between the controller and the forwarder. The controller sends the resource allocation request message to the forwarder. The controller receives the resource configuration message sent by the forwarder. The resource configuration message includes the idle forwarding resource obtained by the forwarder from the total forwarding resources. The controller allocates, according to the idle forwarding resource, the service-accessible forwarding resource to the already created service on the controller. The service-accessible forwarding resource is some or all resources in the idle forwarding resources. After allocating the service-accessible forwarding resource to the service, the controller may deliver data to the already created service. In this embodiment of the present invention, the controller queries, from the forwarder, the idle forwarding resource in the total forwarding resources and allocates the idle forwarding resource for use by the service. This can satisfy a requirement of the service on the controller for a forwarding resource while not affecting allocation of a forwarding resource to a service of the forwarder by the forwarder. Use of the forwarding resources by the forwarder and the controller causes no conflict, and the problem in the prior art that forwarding resources are not fully used can also be resolved.

Figure 2:
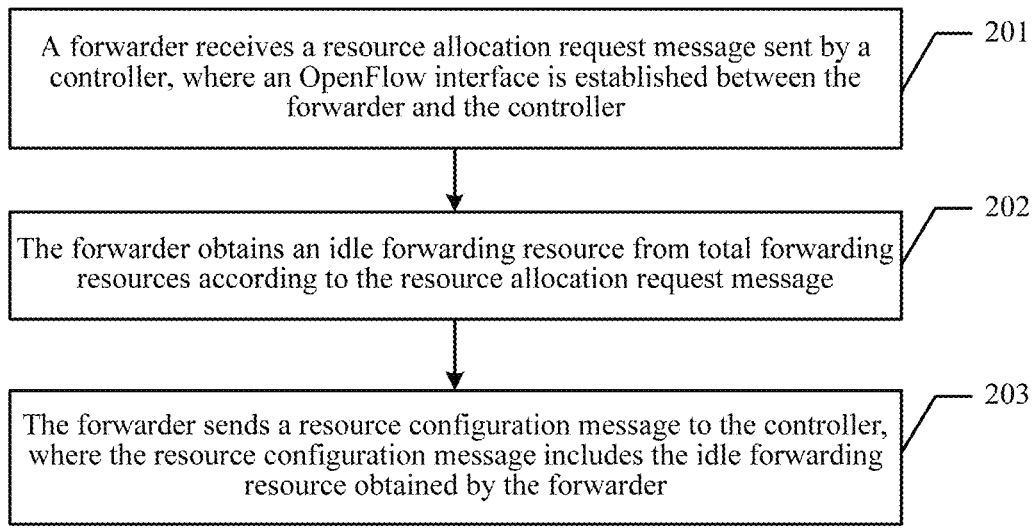
FIG. 2 is a schematic block diagram of a procedure of another OpenFlow protocol-based resource control method according to an embodiment of the present invention.

In the foregoing embodiment, an implementation status in which the OpenFlow protocol-based resource control method of the present invention is applied to the controller is described. In a scenario of control and service hybrid deployment on the controller and the forwarder, for example, in a hybrid mode in which services may be configured on both the controller and the forwarder, the controller queries an idle forwarding resource from the forwarder. Next, an implementation status in which the OpenFlow protocol-based resource control method of the present invention is applied to the forwarder is described. Referring to FIG. 2, an OpenFlow protocol-based resource control method provided by an embodiment of the present invention may specifically include the following steps.

201. A forwarder receives a resource allocation request message sent by a controller, where an OpenFlow interface is established between the forwarder and the controller.

In this embodiment of the present invention, the controller may implement a control plane function in an architecture of separation of a control plane and a forwarding plane of SDN. The controller may be specifically implemented as a server. The forwarder may implement a forwarding plane function in an architecture of separation of a control plane and a forwarding plane of SDN. The forwarder may be specifically implemented as a switch, a router, or the like. In this embodiment of the present invention, the controller and the forwarder may communicate with each other based on an OpenFlow protocol. An OpenFlow interface is established between the controller and the forwarder. The controller and the forwarder may extend the OpenFlow interface. The extended OpenFlow interface may be configured to implement querying, by the controller, an idle forwarding resource from the forwarder. Specifically, a field may be added to a query message in the OpenFlow interface. For example, in this embodiment of the present invention, a control field may be added to multipart messages of the OpenFlow interface, and used to implement querying, by the controller, an idle forwarding resource from the forwarder. The multipart messages are a type of message in the OpenFlow protocol and used for interaction between the controller and the forwarder.

In this embodiment of the present invention, the controller sends a resource allocation request message to the forwarder by using the OpenFlow interface between the controller and the forwarder, to query an idle forwarding resource from the forwarder. A forwarding resource existing on the forwarder is an ID resource used for describing forwarding, including a VLAN ID resource, a label resource, or a VRF resource. In this embodiment of the present invention, the controller needs to query an idle forwarding resource from the forwarder. The forwarder receives the resource allocation request message sent by the controller, and then step 202 is triggered.

202. The forwarder obtains an idle forwarding resource from total forwarding resources according to the resource allocation request message.

In this embodiment of the present invention, after the controller sends the resource allocation request message to the forwarder by using the OpenFlow interface, the forwarder receives the resource allocation request message sent by the controller. The forwarder may obtain the idle forwarding resource from the total forwarding resources according to the resource allocation request message. For example, the forwarder may store the total forwarding resources. A service of the forwarder may occupy some forwarding resources in the total forwarding resources. Alternatively, when no service is currently created on the forwarder, the forwarder may reserve some forwarding resources in the total forwarding resources for the forwarder. The forwarder may determine, according to whether a service is created on the forwarder and how many forwarding resources are occupied by an already created service, forwarding resources from the total forwarding resources as idle forwarding resources to be sent to the controller. For example, the forwarder reserves, from the total forwarding resources, some forwarding resources for use by a service of the forwarder, then uses a forwarding resource remaining in the total forwarding resources as an idle forwarding resource, and sends the idle forwarding resource to the controller. As queried by the controller, the forwarder may select an idle forwarding resource from the total forwarding resources. For example, the total forwarding resources on the forwarder are VLAN ID resources 0 to 4096. If services on the forwarder occupy VLAN ID resources 0 to 2000, or if the forwarder reserves VLAN ID resources 0 to 2000 for use by services of the forwarder, VLAN IDs 2001 to 4096 in the total forwarding resources are still idle, and the forwarder may select idle forwarding resources 2001 to 2201 from the total forwarding resources and send them to the controller for use.

In some implementations of the embodiment of the present invention, querying and returning of an idle forwarding resource between the controller and the forwarder by using the OpenFlow interface is described in the foregoing content. Herein, specifically, the interaction is between the controller and one forwarder Alternatively, the interaction may be between the controller and multiple forwarders. That is, the controller may query idle forwarding resources from multiple forwarders respectively. In such an implementation scenario, in step 201 and step 202, a resource control method is performed by a certain forwarder, and another forwarder, between which and the controller an OpenFlow protocol is established, may also perform the foregoing resource control method. The controller may interact with the multiple forwarders at the same time, or the controller may determine, according to an actual situation of the controller, whether to first interact with some forwarders or to interact with multiple forwarders at the same time. A specific implementation process is not limited.

In some implementations of this embodiment of the present invention, step 201 of receiving, by a forwarder, a resource allocation request message sent by a controller may specifically include the following step:

F1. when the forwarder establishes an initial connection to the controller, the forwarder receives a resource allocation request message for requesting to obtain multiple resources.

In an implementation scenario in which step F1 is performed in the present invention, step 202 of obtaining, by the forwarder, an idle forwarding resource from total forwarding resources according to the resource allocation request message is specifically:

G1. the forwarder obtains multiple idle forwarding resources from the total forwarding resources according to the resource allocation request message for requesting to obtain multiple resources.

Specifically, a specific implementation of querying, by the controller, an idle forwarding resource from the forwarder is described in detail in step F1. There may be multiple different implementations of the querying, by the controller, an idle forwarding resource from the forwarder. In one implementation, the controller queries an idle forwarding resource from the forwarder when the controller establishes an initial connection to the forwarder. That is, the controller can query an idle forwarding resource from the forwarder when a connection relationship is initially established between the controller and the forwarder. In such a manner of querying an idle forwarding resource from the forwarder, the controller has obtained the idle forwarding resource from the forwarder before a service is created on the controller. In this way, the controller can reserve an idle forwarding resource, and the controller can obtain multiple idle forwarding resources from the forwarder, to satisfy requirements of multiple services on the controller. If the forwarder receives a query of the controller for multiple resources, the forwarder may return multiple idle forwarding resources to the controller at a time. In another implementation, the controller queries an idle forwarding resource from the forwarder only when a forwarding resource needs to be allocated to a service on the controller, so as to implement real-time obtaining according to a requirement of a service on the controller. The forwarder may return, to the controller according to a real-time query by the controller, an idle forwarding resource that needs to be used by a current service on the controller.

203. The forwarder sends a resource configuration message to the controller, where the resource configuration message includes the idle forwarding resource obtained by the forwarder.

In this embodiment of the present invention, after obtaining the idle forwarding resource from the total forwarding resources, the forwarder may add the obtained idle forwarding resource to a resource configuration message, and send the resource configuration message to the controller. The controller receives, by using the OpenFlow interface, the resource configuration message sent by the forwarder. The controller may obtain, according to the received resource configuration message, the idle forwarding resource that is allocated to the controller by the forwarder from the total forwarding resources.

In some implementations of this embodiment of the present invention, after step 203 of sending, by the forwarder, a resource configuration message to the controller, the OpenFlow protocol-based resource control method provided by the present invention may further include the following steps:

H1. the forwarder receives a resource release request message sent by the controller, where the resource release request message includes an idle forwarding resource that needs to be released and that is determined by the controller; and H2. the forwarder adds, to the total forwarding resources, the idle forwarding resource that needs to be released.

That is, in this embodiment of the present invention, the OpenFlow interface between the controller and the forwarder is extended. The extended OpenFlow interface may be used to both query and release an idle forwarding resource. Specifically, when the controller does not need to use some idle forwarding resources, the controller may send a resource release request message to the forwarder after determining idle forwarding resources that need to be released. After receiving the resource release request message, the forwarder may obtain an idle forwarding resource released by the controller. The forwarder may recycle the idle forwarding resource released by the controller. The forwarder feeds back a resource release success message to the controller. The idle forwarding resource recycled by the forwarder may be used to be returned to the controller during querying by the controller next time, or provided for use by a service of the forwarder.

It can be learned from the descriptions in the foregoing embodiment of the present invention, the OpenFlow interface is established between the controller and the forwarder. The controller sends the resource allocation request message to the forwarder. The controller receives the resource configuration message sent by the forwarder. The resource configuration message includes the idle forwarding resource obtained by the forwarder from the total forwarding resources. The controller allocates, according to the idle forwarding resource, the service-accessible forwarding resource to the already created service on the controller. The service-accessible forwarding resource is some or all resources in the idle forwarding resources. After allocating the service-accessible forwarding resource to the service, the controller may deliver data to the already created service. In this embodiment of the present invention, the controller queries, from the forwarder, the idle forwarding resource in the total forwarding resources and allocates the idle forwarding resource for use by the service. This can satisfy a requirement of the service on the controller for a forwarding resource while not affecting allocation of a forwarding resource to a service of the forwarder by the forwarder. Use of the forwarding resources by the forwarder and the controller causes no conflict, and the problem in the prior art that forwarding resources are not fully used can also be resolved.

To better understand and implement the foregoing solution of the embodiments of the present invention, specific descriptions are provided below by using corresponding application scenarios as an example.

Figure 3:
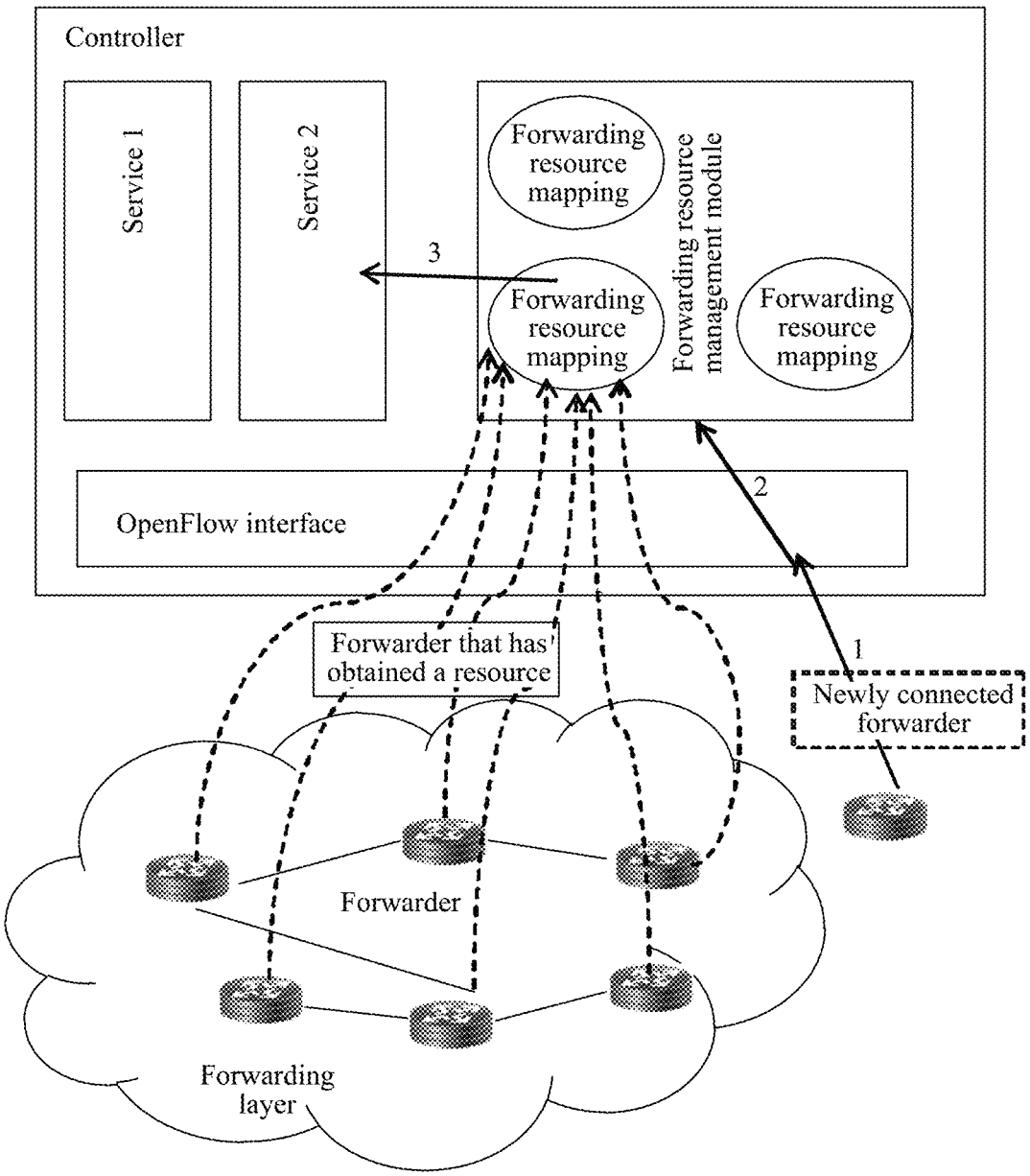
FIG. 3 is a schematic diagram of a scenario in which a controller queries an idle forwarding resource from a forwarder according to an embodiment of the present invention.

Descriptions are provided below by using a scenario of control and service hybrid deployment on a controller and a forwarder in SDN as an example. A case in which the controller queries an idle forwarding resource from the forwarder and the controller reserves a forwarding resource is introduced, to support a hybrid mode. Referring to FIG. 3, FIG. 3 is a schematic diagram of a scenario in which a controller queries an idle forwarding resource from a forwarder according to an embodiment of the present invention. The controller includes a service module and a forwarding resource management module. The service module is configured to: create a service on the controller and query an idle forwarding resource from the forwarding resource management module according to the service. The forwarding resource management module is configured to: query an idle forwarding resource from the forwarder, and allocate a service-accessible forwarding resource to an already created service on the controller. When a forwarder is newly added in SDN, dynamic synchronization of forwarding resources is implemented between the controller and the newly added forwarder. A main process is as follows:

1. When a forwarder is newly added, an OpenFlow interface between the controller and the newly added forwarder is extended. For example, message fields of multipart messages are extended, to support querying, by the controller, an idle forwarding resource from the forwarder, and returning, by the forwarder, the idle forwarding resource to the controller, and releasing the idle forwarding resource. The controller and the forwarder implement querying and returning of the idle forwarding resource by using the extended OpenFlow interface.

2. Add a forwarding resource management module to the controller, and collect idle forwarding resources by using the OpenFlow interface. The forwarding resource management module in the controller is configured to: query an idle forwarding resource from the forwarder and allocate an idle forwarding resource to a service on the controller. For example, some idle forwarding resources are allocated to different services. The forwarding resource management module allocates specific idle forwarding resources according to different services. For example, a label resource may be allocated for use by a Label Distribution Protocol (LDP)

service and a Border Gateway Protocol (BGP) service. For another example, a VLAN ID resource may be allocated for use by a VLAN service.

3. The forwarding resource management module independently queries, according to each forwarder, an idle forwarding resource on the forwarder, and creates one resource pool for each forwarder on the controller. The resource pool has two functions: storing the idle forwarding resource of the forwarder, and performing idle forwarding resource allocation and management for the service on the controller.

4. When the service on the controller needs to use an idle forwarding resource, the service module in the controller requests the forwarding resource management module in the controller to allocate an idle forwarding resource. The forwarding resource management module in the controller queries an idle forwarding resource from the forwarder. A packet corresponding to the service can be delivered only after a service-accessible forwarding resource is successfully allocated to the service. Specifically, the forwarding resource management module may query an idle forwarding resource from the forwarder in the following two manners. In one manner, the forwarding resource management module has obtained a large quantity of idle forwarding resources from the forwarder before a service is created on the controller. If the obtained idle forwarding resources are completely used, an idle forwarding resource may be queried from the forwarder again. In the other manner, the forwarding resource management module queries an idle forwarding resource from the forwarder only when a service on the controller needs to use an idle forwarding resource. After obtaining the idle forwarding resource from the forwarder, the forwarding resource management module may cache the idle forwarding resource, avoiding repeatedly performing querying from the forwarder. Next, an implementation of querying, by the controller, an idle forwarding resource from the forwarder and returning, by the forwarder, an idle forwarding resource is described by using an example.

Referring to FIG. 4-a, FIG. 4-a is a schematic diagram of an application scenario in which a controller queries an idle forwarding resource from a forwarder according to an embodiment of the present invention. In this solution, the controller can query multiple idle forwarding resources. When the controller is connected to the forwarder for the first time, the controller queries an idle forwarding resource from the forwarder. In FIG. 4-a, using a VLAN ID resource as an example, a forwarding resource is dynamic. The forwarder may occupy some forwarding resources. The forwarder returns total forwarding resources (0 to 4096) and current idle forwarding resources (2000 to 4096) to the controller for use. The controller establishes resource management by using the idle forwarding resources (2000 to 4096). The controller predicts, by using the total forwarding resources and the idle forwarding resources that are returned by the forwarder, whether there is still an idle forwarding resource on the forwarder. For example, when quantities of the total forwarding resources and the idle forwarding resources that are returned by the forwarder are equal, it indicates that the forwarder has allocated all forwarding resources to the controller, and there is no idle forwarding resource on the forwarder. When a service on the controller needs to use a forwarding resource, the service module requests the forwarding resource management module to allocate a forwarding resource. After a service-accessible forwarding resource is successfully allocated, the service-accessible forwarding resource can be used to forward a packet corresponding to the service.

Referring to FIG. 4-b, FIG. 4-b is a schematic diagram of another application scenario in which a controller queries an idle forwarding resource from a forwarder according to an embodiment of the present invention. When idle forwarding resources on the controller are completely used, the controller may continue to query a batch of idle forwarding resources, for example, (1800 to 1999), from the forwarder. When quantities of idle forwarding resources and total forwarding resources on the controller are equal, this case may indicate that no service is configured on the forwarder. Data of a service on the forwarder all comes from the controller. Therefore, the controller no longer needs to query an idle forwarding resource from the forwarder. In the implementation in the foregoing example, a manner of querying multiple idle forwarding resources in advance is used. Such a manner is applicable to a scenario in which the forwarder uses a relatively small quantity of forwarding resources and the controller uses a relatively large quantity of forwarding resources, and forwarding resource allocation efficiency is very high.

Referring to FIG. 4-c, FIG. 4-c is a schematic diagram of another application scenario in which a controller queries an idle forwarding resource from a forwarder according to an embodiment of the present invention. In this solution, the controller queries an idle forwarding resource from the forwarder according to a requirement of a service. Specifically, the following steps may be included.

1. When the controller is initially connected to the forwarder, the controller first queries an idle forwarding resource from the forwarder, and creates resource management. Alternatively, when the controller is initially connected to the forwarder, a forwarding resource is not queried, but an empty resource pool is directly created on the controller.

2. A service module in the controller requests a forwarding resource management module in the controller to allocate a forwarding resource.

3. The forwarding resource management module preferentially checks a local cache of the controller. If the local cache of the controller still stores an idle forwarding resource, the forwarding resource management module allocates a service-accessible forwarding resource to an already created service on the controller. Subsequently, start to send a packet corresponding to the already created service. End the entire process after the packet is sent. If the local cache stores no idle forwarding resource, perform step 4 subsequently.

4. If the local cache is empty when the controller queries the local cache for the first time, the forwarding resource management module queries an idle forwarding resource from the forwarder. In this case, the controller queries an idle forwarding resource from the forwarder according to a requirement of a service. A quantity of forwarding resources required by the service on the controller is equal to a quantity of idle forwarding resources to be obtained by the forwarding resource management module from the forwarder.

5. The forwarder sends the idle forwarding resource to the controller, and at the same time, the forwarder sets the idle forwarding resource allocated to the controller to an already allocated state on the forwarder.

6. After obtaining the service-accessible forwarding resource, the service module in the controller uses the service-accessible forwarding resource to send a packet.

A manner of caching an idle forwarding resource may include the following two manners.

1. Caching is performed based on a feature of a service. That is, a service-accessible forwarding resource and the feature of the service are cached together. In this way, if a configuration is incorrectly deleted, the service-accessible forwarding resource can be reconfigured immediately. For example, a static VPN service is configured, and an allocated VRF ID and the VPN service are cached together. Assuming that a VRF ID corresponding to a VPN service 1 is equal to 1, the VRF ID: 1 and the VPN service 1 are cached together during caching, so that the VRF ID resource, that is, the VRF ID being equal to 1, can be allocated for use only by the VPN service 1.

2. Caching is performed based on a forwarding resource. After a service is released, the controller may allocate an idle forwarding resource for use by any newly created service. In some implementations of this embodiment of the present invention, usually, there may be multiple release mechanisms for caching. For example, timed-release (for example, 120 seconds) may be performed, or release may be performed according to an idle proportion (for example, 20% of total forwarding resources), or a combination thereof is used.

In this embodiment of the present invention, extending the OpenFlow interface between the controller and the forwarder may be specifically adding a control field to multipart messages. For the multipart messages, refer to stipulations in OpenFlow-spec-v1.4.0. For example, in the multipart messages, a resource class is extended, and OFPMP_RESOURCE=17. A specific control field is added to the multipart messages. For example, specific resources are extended in a resource class, and each resource may be queried, returned, or released.

It can be learned from the foregoing examples and descriptions of the present invention, the forwarding resource management module is deployed in the controller, to complete management of forwarding resources, so that services can be configured on both the controller and the forwarder, and network flexibility is improved. This is applicable to a scenario of migration from a current network structure to SDN. The forwarder can support a hybrid mode after being slightly changed according to Summary of the invention. In an implementation in which the controller queries multiple idle forwarding resources and then reserves an idle forwarding resource, frequent querying from the forwarder is reduced, and idle forwarding resource allocation efficiency is improved. By means of a demand assignment algorithm and a caching mechanism, forwarding resource allocation flexibility is improved, and efficient use of forwarding resources is maintained. A control field is added by extending the OpenFlow interface. For example, OFPMP_RESOURCE=17 is a newly added control field. In this way, the controller can query an idle forwarding resource from the forwarder or release an idle forwarding resource.

The OpenFlow protocol-based resource control method provided by the present invention may further be applicable to a controller switchover scenario. By means of extended multipart messages, a new controller after the switchover can obtain an idle forwarding resource from the forwarder by using the foregoing execution method, so that the controller completes the switchover smoothly without backup, it can be ensured that a forwarding resource is allocated to a service, and a process of allocating the forwarding resource to the service is prevented from being interrupted. For example, at first, a controller 1 obtains an idle forwarding resource from the forwarder, and then allocates the idle forwarding resource for use by a service. In this case, the controller 1 is switched over to the controller 2. If no control data is backed up between the controller 1 and the controller 2, after the controller 2 substitutes for the controller 1, the controller 2 may obtain an idle forwarding resource from the forwarder, to implement consistency between idle forwarding resources before and after the switchover. The controller 2 may continue to allocate an idle forwarding resource for use by a service.

For ease of description, the foregoing method embodiments are described as a series of action combinations. However, persons skilled in the art should know that the present invention is not limited to the described order of the actions because some steps may be performed in another order or performed at the same time according to the present invention. In addition, persons skilled in the art should also know that all the embodiments described in the specification are embodiments, and the related actions and modules are not necessarily mandatory to the present invention.

To better implement the foregoing solutions of the embodiments of the present invention, the following further provides related apparatuses for implementing the foregoing solutions.

Referring to FIG. 5-*a*, a controller 500 provided by an embodiment of the present invention may include: a sending module 501, a receiving module 502, and a resource allocation module 503.

The sending module 501 is configured to send a resource allocation request message to a forwarder, where an OpenFlow interface is established between the controller and the forwarder.

The receiving module 502 is configured to receive a resource configuration message that is sent by the forwarder in response to the resource allocation request message, where the resource configuration message includes an idle forwarding resource obtained by the forwarder from total forwarding resources.

The resource allocation module 503 is configured to allocate, according to the idle forwarding resource, a service-accessible forwarding resource to an already created service on the controller, where the service-accessible forwarding resource is some or all resources in idle forwarding resources.

In some implementations of this embodiment of the present invention, the sending module 501 is specifically configured to: when the controller establishes an initial connection to the forwarder, send, to the forwarder, a resource allocation request message for requesting to obtain multiple resources; and if multiple idle forwarding resources obtained by the controller have been allocated, re-send, to the forwarder, the resource allocation request message for requesting to obtain multiple resources.

The receiving module 502 is specifically configured to receive a resource configuration message that is re-sent by the forwarder in response to the resource allocation request message, where the resource configuration message that is re-sent by the forwarder includes multiple idle forwarding resources re-obtained by the forwarder from the total forwarding resources.

In some implementations of this embodiment of the present invention, the sending module 501 is further configured to send a resource release request message after the resource allocation module allocates, according to the idle forwarding resource, the service-accessible forwarding resource to the already created service on the controller. The resource release request message includes an idle forwarding resource that is determined by the controller and that needs to be released.

In some implementations of this embodiment of the present invention, the resource allocation module 503 is specifically configured to: store the idle forwarding resource included in the resource configuration message into a resource pool; and obtain the idle forwarding resource from the resource pool, and allocate the idle forwarding resource to the already created service on the controller.

In some implementations of this embodiment of the present invention, referring to FIG. 5-b, the controller 500 further includes a caching module 504, configured to: after the resource allocation module 503 allocates, according to the idle forwarding resource, the service-accessible forwarding resource to the already created service on the controller, establish an association relationship between the already created service on the controller and the service-accessible forwarding resource allocated to the service, and store the association relationship in a local cache of the controller, so that the controller reallocates the service-accessible forwarding resource to the service according to the association relationship.

It can be learned from the descriptions in the foregoing embodiment of the present invention, the OpenFlow interface is established between the controller and the forwarder. The controller sends the resource allocation request message to the forwarder. The controller receives the resource configuration message sent by the forwarder. The resource configuration message includes the idle forwarding resource obtained by the forwarder from the total forwarding resources. The controller allocates, according to the idle forwarding resource, the service-accessible forwarding resource to the already created service on the controller. The service-accessible forwarding resource is some or all resources in the idle forwarding resources. After allocating the service-accessible forwarding resource to the service, the controller may deliver data to the already created service. In this embodiment of the present invention, the controller queries, from the forwarder, the idle forwarding resource in the total forwarding resources and allocates the idle forwarding resource for use by the service. This can satisfy a requirement of the service on the controller for a forwarding resource while not affecting allocation of a forwarding resource to a service of the forwarder by the forwarder. Use of the forwarding resources by the forwarder and the controller causes no conflict, and the problem in the prior art that forwarding resources are not fully used can also be resolved.

Referring to FIG. 6, a forwarder 600 provided by an embodiment of the present invention may include: a receiving module 601, a resource management module 602, and a sending module 603.

The receiving module 601 is configured to receive a resource allocation request message sent by a controller, where an OpenFlow interface is established between the forwarder and the controller.

The resource management module 602 is configured to obtain an idle forwarding resource from total forwarding resources according to the resource allocation request message.

The sending module 603 is configured to send a resource configuration message to the controller, where the resource configuration message includes the idle forwarding resource obtained by the forwarder.

In some implementations of this embodiment of the present invention, the receiving module 601 is specifically configured to: when the forwarder establishes an initial connection to the controller, receive a resource allocation request message for requesting to obtain multiple resources.

The resource management module 602 is specifically configured to obtain multiple idle forwarding resources from the total forwarding resources according to the resource allocation request message for requesting to obtain multiple resources.

In some implementations of this embodiment of the present invention, the receiving module 601 is further configured to: after the sending module sends the resource configuration message to the controller, receive a resource release request message sent by the controller. The resource release request message includes an idle forwarding resource that is determined by the controller and that needs to be released.

The resource management module 602 is further configured to add, to the total forwarding resources, the idle forwarding resource that needs to be released.

It can be learned from the descriptions in the foregoing embodiment of the present invention, the OpenFlow interface is established between the controller and the forwarder. The controller sends the resource allocation request message to the forwarder. The controller receives the resource configuration message sent by the forwarder. The resource configuration message includes the idle forwarding resource obtained by the forwarder from the total forwarding resources. The controller allocates, according to the idle forwarding resource, the service-accessible forwarding resource to the already created service on the controller. The service-accessible forwarding resource is some or all resources in the idle forwarding resources. After allocating the service-accessible forwarding resource to the service, the controller may deliver data to the already created service. In this embodiment of the present invention, the controller queries, from the forwarder, the idle forwarding resource in the total forwarding resources and allocates the idle forwarding resource for use by the service. This can satisfy a requirement of the service on the controller for a forwarding resource while not affecting allocation of a forwarding resource to a service of the forwarder by the forwarder. Use of the forwarding resources by the forwarder and the controller causes no conflict, and the problem in the prior art that forwarding resources are not fully used can also be resolved.

Referring to FIG. 7, an OpenFlow protocol-based resource control system 700 provided by an embodiment of the present invention may include the controller 500 in FIG. 5-a or FIG. 5-b and the forwarder 600 in FIG. 6, where an OpenFlow interface is established between the controller 500 and the forwarder 600.

It can be learned from the descriptions in the foregoing embodiment of the present invention, the OpenFlow interface is established between the controller and the forwarder. The controller sends the resource allocation request message to the forwarder. The controller receives the resource configuration message sent by the forwarder. The resource configuration message includes the idle forwarding resource obtained by the forwarder from the total forwarding resources. The controller allocates, according to the idle forwarding resource, the service-accessible forwarding resource to the already created service on the controller. The service-accessible forwarding resource is some or all resources in the idle forwarding resources. After allocating the service-accessible forwarding resource to the service, the controller may deliver data to the already created service. In this embodiment of the present invention, the controller requests, from the forwarder, the idle forwarding resource in the total forwarding resources and allocates the idle forwarding resource for use by the service. This can satisfy a requirement of the service on the controller for a forwarding resource while not affecting allocation of a forwarding resource to a service of the forwarder by the forwarder. Use of the forwarding resources by the forwarder and the controller causes no conflict, and the problem in the prior art that forwarding resources are not fully used can also be resolved.

Because content such as information exchange between and an execution process of modules/units of the foregoing apparatus belongs to the same idea as the method embodiment of the present invention, the content brings same technical effects as the method embodiment of the present invention. For specific content, refer to the descriptions in the method embodiment of the present invention shown above. This is not further described herein.

An embodiment of the present invention further provides a computer storage medium, where the computer storage medium stores a program, and the program performs some or all of the steps recorded in the foregoing method embodiments.

Figure 8:
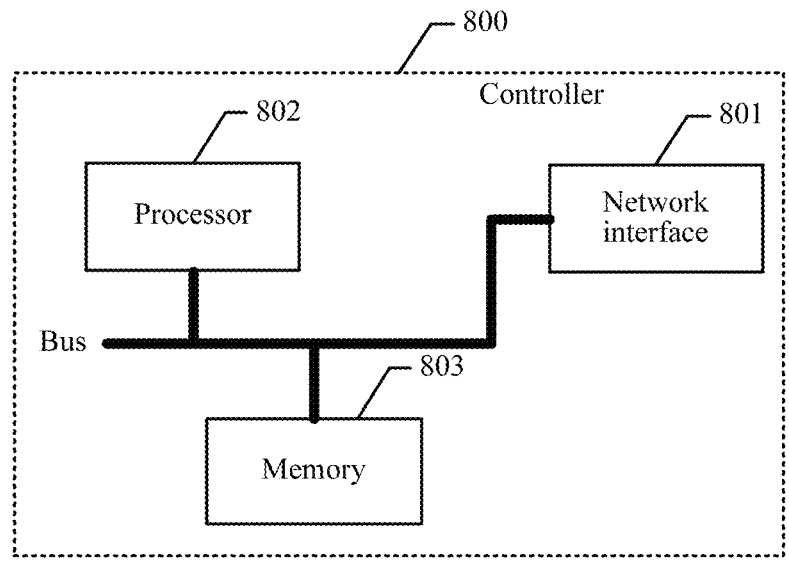
FIG. 8 is a schematic structural composition diagram of a controller according to an embodiment of the present invention.

The following describes a controller provided by an embodiment of the present invention. Referring to FIG. 8, the controller 800 includes:

a network interface 801, a processor 802, and a memory 803 (there may be one or more processors 802 in the controller 800, and one processor is used as an example in FIG. 8). In some implementations of this embodiment of the present invention, the network interface 801, the processor 802, and the memory 803 may be connected by using a bus or in another manner. Connection by using the bus is used as an example in FIG. 8. An implementation of the controller is described by example as follows. The processor 802 in the controller 800 is specifically a central processing unit (CPU), configured to compute and process use of a forwarding resource. The memory 803 is configured to store the forwarding resource. The memory 803 may include a volatile memory such as a random-access memory (RAM). The memory may also include a non-volatile memory such as a read-only memory (ROM), a flash memory, a hard disk drive (HDD), or a solid-state drive (SSD). The memory 803 may also include a combination of the foregoing types of memories. The network interface 801 may be an Ethernet interface, a synchronous digital hierarchy (Synchronous Digital Hierarchy, SDH) interface, or the like, and configured to implement OpenFlow protocol-based communication with a forwarder.

The processor 802 is configured to perform the following steps:

sending a resource allocation request message to the forwarder;

receiving a resource configuration message that is sent by the forwarder in response to the resource allocation request message, where the resource configuration message includes an idle forwarding resource obtained by the forwarder from total forwarding resources; and allocating, according to the idle forwarding resource, a service-accessible forwarding resource to an already created service on the controller, where the service-accessible forwarding resource is some or all resources in idle forwarding resources.

In some implementations of this embodiment of the present invention, the processor 802 is specifically configured to perform the following steps:

when the controller establishes an initial connection to the forwarder, sending, to the forwarder, a resource allocation request message for requesting to obtain multiple resources;

if multiple idle forwarding resources obtained by the controller have been allocated, re-sending, to the forwarder, the resource allocation request message for requesting to obtain multiple resources; and receiving a resource configuration message that is re-sent by the forwarder, where the resource configuration message that is re-sent by the forwarder includes multiple idle forwarding resources re-obtained by the forwarder from the total forwarding resources.

It can be learned from the descriptions in the foregoing embodiment of the present invention, the OpenFlow interface is established between the controller and the forwarder. The controller sends the resource allocation request message to the forwarder. The controller receives the resource configuration message sent by the forwarder. The resource configuration message includes the idle forwarding resource obtained by the forwarder from the total forwarding resources. The controller allocates, according to the idle forwarding resource, the service-accessible forwarding resource to the already created service on the controller. The service-accessible forwarding resource is some or all resources in the idle forwarding resources. After allocating the service-accessible forwarding resource to the service, the controller may deliver data to the already created service. In this embodiment of the present invention, the controller queries, from the forwarder, the idle forwarding resource in the total forwarding resources and allocates the idle forwarding resource for use by the service. This can satisfy a requirement of the service on the controller for a forwarding resource while not affecting allocation of a forwarding resource to a service of the forwarder by the forwarder. Use of the forwarding resources by the forwarder and the controller causes no conflict, and the problem in the prior art that forwarding resources are not fully used can also be resolved.

Figure 9:
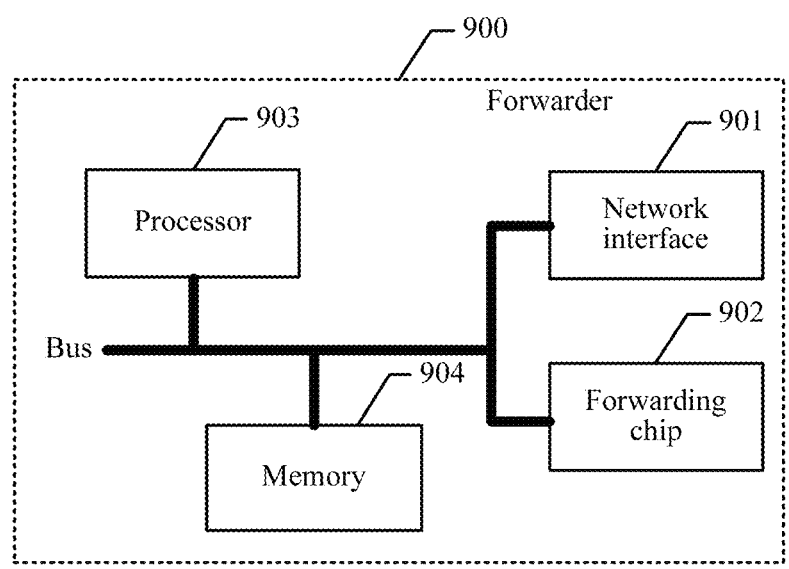
FIG. 9 is a schematic structural composition diagram of a forwarder according to an embodiment of the present invention.

The following describes a forwarder provided by an embodiment of the present invention. Referring to FIG. 9, the forwarder 900 includes:

a network interface 901, a forwarding chip 902, a processor 903, and a memory 904 (there may be one or more processors 903 in the forwarder 900, and one processor is used as an example in FIG. 9). In some implementations of this embodiment of the present invention, the network interface 901, the forwarding chip 902, the processor 903, and the memory 904 may be connected by using a bus or in another manner. Connection by using the bus is used as an example in FIG. 9. An implementation of the forwarder is described by example as follows. The processor 903 in the forwarder 900 may be specifically a central processing unit (CPU), configured to compute and process data, for example, configured to compute a control plane on the forwarder. The memory 904 is configured to store data. A specific implementation of the memory 904 may be similar to that of the memory 803 in the foregoing embodiment. The network interface 901 may be an Ethernet interface, an SDH interface, or the like, and configured to: implement Open-Flow protocol-based communication with a controller, and forward a packet corresponding to a service. The forwarding chip 902 may be one or more cores in the CPU that are used for forwarding, a network processor (NP), a hardware chip, or any combination thereof. The foregoing hardware chip may be an application-specific integrated circuit (ASIC), a programmable logic device (PLD), or a combination thereof. The foregoing PLD may be a complex programmable logic device (CPLD), a field-programmable gate array (FPGA), a generic array logic (GAL), or any combination thereof.

The processor 903 is configured to perform the following steps:

receiving a resource allocation request message sent by the controller;

obtaining an idle forwarding resource from total forwarding resources according to the resource allocation request message; and sending a resource configuration message to the controller, where the resource configuration message includes the idle forwarding resource obtained by the forwarder.

In some implementations of this embodiment of the present invention, the processor 903 is specifically configured to perform the following steps:

when the forwarder establishes an initial connection to the controller, receiving a resource allocation request message for requesting to obtain multiple resources; and obtaining multiple idle forwarding resources from the total forwarding resources according to the resource allocation request message for requesting to obtain multiple resources.

It can be learned from the descriptions in the foregoing embodiment of the present invention, the OpenFlow interface is established between the controller and the forwarder. The controller sends the resource allocation request message to the forwarder. The controller receives the resource configuration message sent by the forwarder. The resource configuration message includes the idle forwarding resource obtained by the forwarder from the total forwarding resources. The controller allocates, according to the idle forwarding resource, the service-accessible forwarding resource to the already created service on the controller. The service-accessible forwarding resource is some or all resources in the idle forwarding resources. After allocating the service-accessible forwarding resource to the service, the controller may deliver data to the already created service. In this embodiment of the present invention, the controller queries, from the forwarder, the idle forwarding resource in the total forwarding resources and allocates the idle forwarding resource for use by the service. This can satisfy a requirement of the service on the controller for a forwarding resource while not affecting allocation of a forwarding resource to a service of the forwarder by the forwarder. Use of the forwarding resources by the forwarder and the controller causes no conflict, and the problem in the prior art that forwarding resources are not fully used can also be resolved.

In addition, it should be noted that the described apparatus embodiment is merely an example. The units described as separate parts may or may not be physically separate, and parts displayed as units may or may not be physical units, may be located in one position, or may be distributed on a plurality of network devices. Some or all the modules may be selected according to actual needs to achieve the objectives of the solutions of the embodiments. In addition, in the accompanying drawings of the apparatus embodiments provided by the present invention, connection relationships between modules indicate that the modules have communication connections with each other.

Based on the foregoing descriptions of the embodiments, persons skilled in the art may clearly understand that the present invention may be implemented by software in addition to necessary universal hardware or by dedicated hardware only, including a dedicated integrated circuit, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, or a dedicated circuit. The technical solutions of the present invention may be implemented in a form of a software product. The software product is stored in a readable storage medium, such as a floppy disk, a flash memory, a removable hard disk, a read-only memory, a random access memory, a magnetic disk, or an optical disc of a computer, and includes several instructions for instructing a computer device (which may be a personal computer, a server, or a network device) to perform the methods described in the embodiments of the present invention.

In conclusion, the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof.

What is claimed is:

1. An OpenFlow protocol-based resource control method, comprising:

sending, by a controller, a resource allocation request message to a forwarder, wherein an OpenFlow interface is established between the controller and the forwarder, wherein forwarding services are configured on both the controller and the forwarder;

receiving, by the controller, a resource configuration message from the forwarder, wherein the resource configuration message is sent by the forwarder in response to the resource allocation request message, and the resource configuration message includes an idle forwarding resource obtained by the forwarder from total forwarding resources on the forwarder, the idle forwarding resource including a resource that is not an already occupied forwarding resource;

creating, by the controller, a resource pool configured to store the idle forwarding resource obtained by the forwarder and perform resource allocation and management for an already created service on the controller;

allocating, by the controller according to the idle forwarding resource in the resource pool, a service-accessible forwarding resource to the already created service on the controller, wherein the service-accessible forwarding resource includes some or all resources in the idle forwarding resource;

sending a resource release request message to the forwarder, where the resource release request message includes an idle forwarding resource that needs to be released by the controller; and establishing an association relationship between the already created service on the controller and the service-accessible forwarding resource allocated to the service, so that the controller can reallocate the service-accessible forwarding resource to the already created service according to the association relationship after the controller releases the service-accessible forwarding resource.

2. The method according to claim 1, wherein the sending, by a controller, a resource allocation request message to a forwarder comprises:

sending, by the controller to the forwarder, a resource allocation request message for requesting to obtain multiple resources when the controller establishes an initial connection to the forwarder; and re-sending, by the controller to the forwarder, the resource allocation request message for requesting to obtain multiple resources if multiple idle forwarding resources obtained by the controller have been allocated; and the receiving, by the controller, a resource configuration message from the forwarder includes:
receiving, by the controller, a resource configuration message that is re-sent by the forwarder in response to the resource allocation request message, wherein the resource configuration message that is re-sent by the forwarder includes multiple idle forwarding resources re-obtained by the forwarder from the total forwarding resources.

3. An OpenFlow protocol-based resource control method, comprising:
receiving, by a forwarder, a resource allocation request message sent by a controller, wherein an OpenFlow interface is established between the forwarder and the controller, wherein forwarding services are configured on both the controller and the forwarder;
obtaining, by the forwarder, an idle forwarding resource from total forwarding resources on the forwarder according to the resource allocation request message, the idle forwarding resource including a resource that is not an already occupied forwarding resource;
sending, by the forwarder, a resource configuration message to the controller, wherein the resource configuration message includes the idle forwarding resource obtained by the forwarder;
receiving a resource release request message from the forwarder, where the resource release request message includes an idle forwarding resource that needs to be released by the controller;
adding, to the total forwarding resources, the idle forwarding resource released by the controller;
sending a resource release success message to the controller; and
establishing an association relationship between an already created service on the controller and a service-accessible forwarding resource allocated to the service, so that the controller can reallocate the service-accessible forwarding resource to the already created service according to the association relationship after the controller releases the service-accessible forwarding resource.

4. The method according to claim 3, wherein the receiving, by a forwarder, a resource allocation request message sent by a controller comprises:
receiving, by the forwarder, a resource allocation request message for requesting to obtain multiple resources when the forwarder establishes an initial connection to the controller; and
the obtaining, by the forwarder, an idle forwarding resource from total forwarding resources according to the resource allocation request message includes:
obtaining, by the forwarder, multiple idle forwarding resources from the total forwarding resources according to the resource allocation request message for requesting to obtain multiple resources.

5. A controller, comprising:
a memory; and
a processor coupled to the memory and configured to:
send a resource allocation request message to a forwarder, wherein an OpenFlow interface is established between the controller and the forwarder, wherein forwarding services are configured on both the controller and the forwarder;
receive a resource configuration message from the forwarder, wherein the resource configuration message is sent by the forwarder in response to the resource allocation request message, and the resource configuration message includes an idle forwarding resource obtained by the forwarder from total forwarding resources on the forwarder, the idle forwarding resource including a resource that is not an already occupied forwarding resource;
creating, by the controller, a resource pool configured to store the idle forwarding resource obtained by the forwarder and perform resource allocation and management for an already created service on the controller;
allocate, by the resource pool of the controller according to the idle forwarding resource, a service-accessible forwarding resource to the already created service on the controller, wherein the service-accessible forwarding resource includes some or all resources in the idle forwarding resource;
send a resource release request message to the forwarder, where the resource release request message includes an idle forwarding resource that needs to be released by the controller; and
establish an association relationship between the already created service on the controller and the service-accessible forwarding resource allocated to the service, so that the controller can reallocate the service-accessible forwarding resource to the already created service according to the association relationship after the controller releases the service-accessible forwarding resource.

6. The controller according to claim 5, wherein the processor is further configured to:
when the controller establishes an initial connection to the forwarder, send, to the forwarder, a resource allocation request message for requesting to obtain multiple resources; and if multiple idle forwarding resources obtained by the controller have been allocated, re-send, to the forwarder, the resource allocation request message for requesting to obtain multiple resources; and
receive a resource configuration message that is re-sent by the forwarder in response to the resource allocation request message, wherein the resource configuration message that is re-sent by the forwarder includes multiple idle forwarding resources re-obtained by the forwarder from the total forwarding resources.

7. A forwarder, comprising:
a memory; and
a processor coupled to the memory and configured to:
receive a resource allocation request message sent by a controller, wherein an OpenFlow interface is established between the forwarder and the controller, wherein forwarding services are configured on both the controller and the forwarder;
obtain an idle forwarding resource from total forwarding resources on the forwarder according to the resource allocation request message, the idle forwarding resource including a resource that is not an already occupied forwarding resource;
send a resource configuration message to the controller, wherein the resource configuration message includes the idle forwarding resource obtained by the forwarder;
receive a resource release request message from the forwarder, where the resource release request message includes an idle forwarding resource that needs to be released by the controller;
add, to the total forwarding resources, the idle forwarding resource released by the controller;
send a resource release success message to the controller; and establish an association relationship between an already created service on the controller and a service-accessible forwarding resource allocated to the service, so that the controller can reallocate the service-accessible forwarding resource to the already created service according to the association relationship after the controller releases the service-accessible forwarding resource.

8. The forwarder according to claim 7, wherein the processor is further configured to:
when the forwarder establishes an initial connection to the controller, receive a resource allocation request message for requesting to obtain multiple resources; and
obtain multiple idle forwarding resources from the total forwarding resources according to the resource allocation request message for requesting to obtain multiple resources.

9. A controller comprising:
a network interface and a processor, wherein
the network interface is configured to implement OpenFlow protocol-based communication with a forwarder, wherein forwarding services are configured on both the controller and the forwarder; and
the processor is configured to:
send a resource allocation request message to the forwarder;
receive a resource configuration message from the forwarder, wherein the resource configuration message is sent by the forwarder in response to the resource allocation request message, and the resource configuration message includes an idle forwarding resource obtained by the forwarder from total forwarding resources on the forwarder, the idle forwarding resource including a resource that is not an already occupied forwarding resource;
creating, by the controller, a resource pool configured to store the idle forwarding resource obtained by the forwarder and perform resource allocation and management for an already created service on the controller;
allocate, by the resource pool of the controller according to the idle forwarding resource, a service-accessible forwarding resource to the already created service on the controller, wherein the service-accessible forwarding resource includes some or all resources in the idle forwarding resource;
send a resource release request message to the forwarder, where the resource release request message includes an idle forwarding resource that needs to be released by the controller; and
establish an association relationship between the already created service on the controller and the service-accessible forwarding resource allocated to the service, so that the controller can reallocate the service-accessible forwarding resource to the already created service according to the association relationship after the controller releases the service-accessible forwarding resource.

10. The controller according to claim 9, wherein the processor is configured to:
when the controller establishes an initial connection to the forwarder, send, to the forwarder, a resource allocation request message for requesting to obtain multiple resources;
if multiple idle forwarding resources obtained by the controller have been allocated, re-send, to the forwarder, the resource allocation request message for requesting to obtain multiple resources; and receive a resource configuration message that is re-sent by the forwarder in response to the resource allocation request message, wherein the resource configuration message that is re-sent by the forwarder includes multiple idle forwarding resources re-obtained by the forwarder from the total forwarding resources.

11. A forwarder, comprising a network interface and a processor, wherein
the network interface is configured to implement OpenFlow protocol-based communication with a controller, wherein forwarding services are configured on both the controller and the forwarder; and
the processor is configured to:
receive a resource allocation request message sent by the controller;
obtain an idle forwarding resource from total forwarding resources on the forwarder according to the resource allocation request message, the idle forwarding resource including a resource that is not an already occupied forwarding resource;
send a resource configuration message to the controller, wherein the resource configuration message includes the idle forwarding resource obtained by the forwarder;
receive a resource release request message from the forwarder, where the resource release request message includes an idle forwarding resource that needs to be released by the controller;
add, to the total forwarding resources, the idle forwarding resource released by the controller;
send a resource release success message to the controller; and
establish an association relationship between an already created service on the controller and a service-accessible forwarding resource allocated to the service, so that the controller can reallocate the service-accessible forwarding resource to the already created service according to the association relationship after the controller releases the service-accessible forwarding resource.

12. The forwarder according to claim 11, wherein the processor is configured to:
when the forwarder establishes an initial connection to the controller, receive a resource allocation request message for requesting to obtain multiple resources; and obtain multiple idle forwarding resources from the total forwarding resources according to the resource allocation request message for requesting to obtain multiple resources.

* * * * *